United States Patent
Burrow et al.

(10) Patent No.: US 11,435,171 B2
(45) Date of Patent: Sep. 6, 2022

(54) DEVICE AND METHOD OF DETERMINING THE FORCE REQUIRED TO REMOVE A PROJECTILE FROM AN AMMUNITION CARTRIDGE

(71) Applicant: True Velocity IP Holdings, LLC, Garland, TX (US)

(72) Inventors: Lonnie Burrow, Carrollton, TX (US); Tucker Siuts, Garland, TX (US)

(73) Assignee: True Velocity IP Holdings, LLC, Garland, TX (US)

( * ) Notice: Subject to any disclaimer, the term of this patent is extended or adjusted under 35 U.S.C. 154(b) by 883 days.

(21) Appl. No.: 16/270,196

(22) Filed: Feb. 7, 2019

(65) Prior Publication Data

US 2019/0249967 A1     Aug. 15, 2019

Related U.S. Application Data

(60) Provisional application No. 62/630,515, filed on Feb. 14, 2018.

(51) Int. Cl.
  *G01L 5/00*     (2006.01)
  *F42B 35/02*    (2006.01)
  (Continued)

(52) U.S. Cl.
  CPC ............. *F42B 35/02* (2013.01); *F42B 33/06* (2013.01); *G01L 5/0028* (2013.01); *G01L 5/0033* (2013.01); *F42B 35/00* (2013.01)

(58) Field of Classification Search
  CPC .......... F42B 35/02; F42B 33/06; F42B 35/00; G01L 5/0028; G01L 5/0033
  See application file for complete search history.

(56) References Cited

U.S. PATENT DOCUMENTS

| 99,528 A | 2/1870 | Boyd |
| 113,634 A | 4/1871 | Crispin |

(Continued)

FOREIGN PATENT DOCUMENTS

| CA | 2813634 A1 | 4/2012 |
| CN | 102901403 B | 6/2014 |

(Continued)

OTHER PUBLICATIONS

ISRWO in PCT/US2020/042258 dated Feb. 19, 2021, pp. 1-12.
(Continued)

*Primary Examiner* — Max H Noori
(74) *Attorney, Agent, or Firm* — Burdick Patents, P.A.; Sean Burdick

(57) ABSTRACT

The present invention includes a device for determining the force necessary for the separation of a bullet from an ammunition cartridge comprising a chamber housing having central bore extending from a lower housing end to an upper housing end and terminating at a upper aperture, wherein the central bore comprises a chamber diameter adapted to accept an ammunition cartridge and that the bullet partially extends from the upper aperture; a frustaconical shape shoulder in the central bore at the upper housing end to reduce the chamber diameter to mate to an ammunition cartridge shoulder; a neck that connects the upper aperture to the frustaconical shape shoulder adapted to accept an ammunition cartridge neck; a cartridge retention lip within the upper aperture adapted to contact an ammunition cartridge bullet aperture; a chamber mount adapted to connect the chamber housing and a testing device; a bullet securing device comprising a bullet securing end to secure the bullet and a bullet securing device mount adapted to connect to the testing device; a moving mechanism to move the bullet securing device away from the chamber housing; a sensor in (Continued)

communication with the moving mechanism to measure a force exerted by the moving mechanism; and a display in communication with the sensor to display and or record the force.

15 Claims, 5 Drawing Sheets

(51) Int. Cl.
*F42B 33/06* (2006.01)
*F42B 35/00* (2006.01)

(56) References Cited

U.S. PATENT DOCUMENTS

| | | | |
|---|---|---|---|
| 130,679 A | 8/1872 | Whitmore | |
| 159,665 A | 2/1875 | Gauthey | |
| 169,807 A | 11/1875 | Hart | |
| 207,248 A | 8/1878 | Bush et al. | |
| 462,611 A | 11/1891 | Comte de Sparre | |
| 475,008 A | 5/1892 | Bush | |
| 498,856 A | 6/1893 | Overbaugh | |
| 640,856 A | 1/1900 | Bailey | |
| 662,137 A | 11/1900 | Tellerson | |
| 676,000 A | 6/1901 | Henneberg | |
| 743,242 A | 11/1903 | Bush | |
| 865,979 A | 9/1907 | Bailey | |
| 869,046 A | 10/1907 | Bailey | |
| 905,358 A | 12/1908 | Peters | |
| 957,171 A | 5/1910 | Loeb | |
| 963,911 A | 7/1910 | Loeble | |
| 1,060,817 A | 5/1913 | Clyne | |
| 1,060,818 A | 5/1913 | Clyne | |
| 1,842,445 A | 1/1932 | Clyne | |
| 1,936,905 A | 11/1933 | Gaidos | |
| 1,940,657 A | 12/1933 | Woodford | |
| 2,294,822 A | 9/1942 | Norman | |
| 2,465,962 A | 3/1949 | Allen et al. | |
| 2,654,319 A | 10/1953 | Roske | |
| 2,823,611 A | 2/1958 | Thayer | |
| 2,862,446 A | 12/1958 | Lars | |
| 2,918,868 A | 12/1959 | Lars | |
| 2,953,990 A | 9/1960 | Miller | |
| 2,972,947 A | 2/1961 | Fitzsimmons et al. | |
| 3,099,958 A | 8/1963 | Daubenspeck et al. | |
| 3,159,701 A | 12/1964 | Herter | |
| 3,170,401 A | 2/1965 | Johnson et al. | |
| 3,171,350 A | 3/1965 | Metcalf et al. | |
| 3,242,789 A | 3/1966 | Woodring | |
| 3,246,603 A | 4/1966 | Comerford | |
| 3,292,538 A | 12/1966 | Hans et al. | |
| 3,332,352 A | 7/1967 | Olson et al. | |
| 3,485,170 A | 12/1969 | Scanlon | |
| 3,485,173 A | 12/1969 | Morgan | |
| 3,609,904 A | 10/1971 | Scanlon | |
| 3,659,528 A | 5/1972 | Santala | |
| 3,688,699 A | 9/1972 | Horn et al. | |
| 3,690,256 A | 9/1972 | Schnitzer | |
| 3,745,924 A | 7/1973 | Scanlon | |
| 3,749,021 A | 7/1973 | Burgess | |
| 3,756,156 A | 9/1973 | Schuster | |
| 3,765,297 A | 10/1973 | Skochko et al. | |
| 3,768,413 A | 10/1973 | Ramsay | |
| 3,786,755 A | 1/1974 | Eckstein et al. | |
| 3,797,396 A | 3/1974 | Reed | |
| 3,842,739 A | 10/1974 | Scanlon et al. | |
| 3,866,536 A | 2/1975 | Greenberg | |
| 3,874,294 A | 4/1975 | Hale | |
| 3,955,506 A | 5/1976 | Luther et al. | |
| 3,977,326 A | 8/1976 | Anderson et al. | |
| 3,990,366 A | 11/1976 | Scanlon | |
| 4,005,630 A | 2/1977 | Patrick | |
| 4,020,763 A | 5/1977 | Iruretagoyena | |
| 4,147,107 A | 4/1979 | Ringdal | |
| 4,157,684 A | 6/1979 | Clausser | |
| 4,173,186 A | 11/1979 | Dunham | |
| 4,187,271 A | 2/1980 | Rolston et al. | |
| 4,228,724 A | 10/1980 | Leich | |
| 4,248,132 A * | 2/1981 | Blomseth | F42B 35/02 86/24 |
| 4,276,830 A | 7/1981 | Alice | |
| 4,475,435 A | 10/1984 | Mantel | |
| 4,483,251 A | 11/1984 | Spalding | |
| 4,598,445 A | 7/1986 | O'Connor | |
| 4,614,157 A | 9/1986 | Grelle et al. | |
| 4,679,505 A | 7/1987 | Reed | |
| 4,718,348 A | 1/1988 | Ferrigno | |
| 4,719,859 A | 1/1988 | Ballreich et al. | |
| 4,726,296 A | 2/1988 | Leshner et al. | |
| 4,763,576 A | 8/1988 | Kass et al. | |
| 4,867,065 A | 9/1989 | Kaltmann et al. | |
| 4,970,959 A | 11/1990 | Bilsbury et al. | |
| 5,021,206 A | 6/1991 | Stoops | |
| 5,033,386 A | 7/1991 | Vatsvog | |
| 5,063,853 A | 11/1991 | Bilgeri | |
| 5,090,327 A | 2/1992 | Bilgeri | |
| 5,127,331 A | 7/1992 | Stoops | |
| 5,151,555 A | 9/1992 | Vatsvog | |
| 5,165,040 A | 11/1992 | Andersson et al. | |
| 5,233,124 A * | 8/1993 | Peterson | F42B 35/02 86/24 |
| 5,237,930 A | 8/1993 | Belanger et al. | |
| 5,247,888 A | 9/1993 | Conil | |
| 5,259,288 A | 11/1993 | Vatsvog | |
| 5,265,540 A | 11/1993 | Ducros et al. | |
| D345,676 S | 4/1994 | Biffle | |
| 5,433,148 A | 7/1995 | Barratault et al. | |
| 5,535,495 A | 7/1996 | Gutowski | |
| 5,563,365 A | 10/1996 | Dineen et al. | |
| 5,616,642 A | 4/1997 | West et al. | |
| D380,650 S | 7/1997 | Norris | |
| 5,679,920 A | 10/1997 | Hallis et al. | |
| 5,770,815 A | 6/1998 | Watson | |
| 5,798,478 A | 8/1998 | Beal | |
| 5,950,063 A | 9/1999 | Hens et al. | |
| 5,961,200 A | 10/1999 | Friis | |
| 5,969,288 A | 10/1999 | Baud | |
| 6,004,682 A | 12/1999 | Rackovan et al. | |
| 6,048,379 A | 4/2000 | Bray et al. | |
| 6,070,532 A | 6/2000 | Halverson | |
| D435,626 S | 12/2000 | Benini | |
| 6,257,149 B1 | 7/2001 | Cesaroni | |
| D447,209 S | 8/2001 | Benini | |
| 6,272,993 B1 | 8/2001 | Cook et al. | |
| 6,283,035 B1 | 9/2001 | Olson et al. | |
| 6,357,357 B1 | 3/2002 | Glasser | |
| D455,052 S | 4/2002 | Gullickson et al. | |
| D455,320 S | 4/2002 | Edelstein | |
| 6,375,971 B1 | 4/2002 | Hansen | |
| 6,450,099 B1 | 9/2002 | Desgland | |
| 6,460,464 B1 | 10/2002 | Attarwala | |
| 6,523,476 B1 | 2/2003 | Riess et al. | |
| 6,649,095 B2 | 11/2003 | Buja | |
| 6,672,219 B2 | 1/2004 | Mackerell et al. | |
| 6,708,621 B1 | 3/2004 | Forichon-Chaumet et al. | |
| 6,752,084 B1 | 6/2004 | Husseini et al. | |
| 6,810,816 B2 | 11/2004 | Rennard | |
| 6,840,149 B2 | 1/2005 | Beal | |
| 6,845,716 B2 | 1/2005 | Husseini et al. | |
| 7,000,547 B2 | 2/2006 | Amick | |
| 7,014,284 B2 | 3/2006 | Morton et al. | |
| 7,032,492 B2 | 4/2006 | Meshirer | |
| 7,056,091 B2 | 6/2006 | Powers | |
| 7,059,234 B2 | 6/2006 | Husseini | |
| 7,165,496 B2 | 1/2007 | Reynolds | |
| D540,710 S | 4/2007 | Charrin | |
| 7,204,191 B2 | 4/2007 | Wiley et al. | |
| 7,213,519 B2 | 5/2007 | Wiley et al. | |
| 7,231,519 B2 | 6/2007 | Joseph et al. | |
| 7,232,473 B2 | 6/2007 | Elliott | |
| 7,299,750 B2 | 11/2007 | Schikora et al. | |
| 7,353,756 B2 | 4/2008 | Leasure | |
| 7,380,505 B1 | 6/2008 | Shiery | |
| 7,383,776 B2 | 6/2008 | Amick | |

(56) References Cited

U.S. PATENT DOCUMENTS

| | | |
|---|---|---|
| 7,392,746 B2 | 7/2008 | Hansen |
| 7,441,504 B2 | 10/2008 | Husseini et al. |
| D583,927 S | 12/2008 | Benner |
| 7,458,322 B2 | 12/2008 | Reynolds et al. |
| 7,461,597 B2 | 12/2008 | Brunn |
| 7,568,417 B1 * | 8/2009 | Lee ............... F42B 33/06 86/49 |
| 7,585,166 B2 | 9/2009 | Buja |
| 7,610,858 B2 | 11/2009 | Chung |
| 7,750,091 B2 | 7/2010 | Maljkovic et al. |
| D626,619 S | 11/2010 | Gogol et al. |
| 7,841,279 B2 | 11/2010 | Reynolds et al. |
| D631,699 S | 2/2011 | Moreau |
| D633,166 S | 2/2011 | Richardson et al. |
| 7,921,780 B2 * | 4/2011 | Harrison ............. F42B 30/02 102/524 |
| 7,930,977 B2 | 4/2011 | Klein |
| 8,007,370 B2 | 8/2011 | Hirsch et al. |
| 8,056,232 B2 | 11/2011 | Patel et al. |
| 8,141,467 B1 * | 3/2012 | Corder ............... F42B 35/02 86/24 |
| 8,156,870 B2 | 4/2012 | South |
| 8,186,273 B2 | 5/2012 | Trivette |
| 8,201,867 B2 | 6/2012 | Thomeczek |
| 8,206,522 B2 | 6/2012 | Sandstrom et al. |
| 8,240,252 B2 | 8/2012 | Maljkovic et al. |
| D675,882 S | 2/2013 | Crockett |
| 8,393,273 B2 | 3/2013 | Weeks et al. |
| 8,408,137 B2 | 4/2013 | Battaglia |
| D683,419 S | 5/2013 | Rebar |
| 8,443,729 B2 | 5/2013 | Mittelstaedt |
| 8,443,730 B2 | 5/2013 | Padgett |
| 8,511,233 B2 | 8/2013 | Nilsson |
| D689,975 S | 9/2013 | Carlson et al. |
| 8,522,684 B2 | 9/2013 | Davies et al. |
| 8,540,828 B2 | 9/2013 | Busky et al. |
| 8,561,543 B2 | 10/2013 | Burrow |
| 8,573,126 B2 | 11/2013 | Klein et al. |
| 8,641,842 B2 | 2/2014 | Hafner et al. |
| 8,689,696 B1 | 4/2014 | Seeman et al. |
| 8,763,535 B2 | 7/2014 | Padgett |
| 8,790,455 B2 | 7/2014 | Borissov et al. |
| 8,807,008 B2 | 8/2014 | Padgett et al. |
| 8,813,650 B2 | 8/2014 | Maljkovic et al. |
| D715,888 S | 10/2014 | Padgett |
| 8,850,985 B2 | 10/2014 | Maljkovic et al. |
| 8,857,343 B2 | 10/2014 | Marx |
| 8,869,702 B2 | 10/2014 | Padgett |
| D717,909 S | 11/2014 | Thrift et al. |
| 8,875,633 B2 | 11/2014 | Padgett |
| 8,893,621 B1 | 11/2014 | Escobar |
| 8,978,559 B2 | 3/2015 | Davies et al. |
| 9,003,973 B1 | 4/2015 | Padgett |
| 9,032,855 B1 | 5/2015 | Foren et al. |
| 9,091,516 B2 | 7/2015 | Davies et al. |
| 9,103,641 B2 | 8/2015 | Nielson et al. |
| 9,157,709 B2 | 10/2015 | Nuetzman et al. |
| 9,170,080 B2 | 10/2015 | Poore et al. |
| 9,182,204 B2 | 11/2015 | Maljkovic et al. |
| 9,188,412 B2 | 11/2015 | Maljkovic et al. |
| 9,200,157 B2 | 12/2015 | El-Hibri et al. |
| 9,200,880 B1 | 12/2015 | Foren et al. |
| 9,212,876 B1 | 12/2015 | Kostka et al. |
| 9,212,879 B2 | 12/2015 | Whitworth |
| 9,213,175 B2 | 12/2015 | Arnold |
| 9,254,503 B2 | 2/2016 | Ward |
| 9,255,775 B1 | 2/2016 | Rubin |
| D752,397 S | 3/2016 | Seiders et al. |
| D754,223 S | 4/2016 | Pederson et al. |
| 9,329,004 B2 | 5/2016 | Pace |
| 9,335,137 B2 | 5/2016 | Maljkovic et al. |
| 9,337,278 B1 | 5/2016 | Gu et al. |
| 9,347,457 B2 | 5/2016 | Ahrens et al. |
| 9,366,512 B2 | 6/2016 | Burczynski et al. |
| 9,377,278 B2 | 6/2016 | Rubin |
| 9,389,052 B2 | 7/2016 | Conroy et al. |
| 9,395,165 B2 | 7/2016 | Maljkovic et al. |
| D764,624 S | 8/2016 | Masinelli |
| D765,214 S | 8/2016 | Padgett |
| 9,429,407 B2 | 8/2016 | Burrow |
| 9,441,930 B2 | 9/2016 | Burrow |
| 9,453,714 B2 | 9/2016 | Bosarge et al. |
| D773,009 S | 11/2016 | Bowers |
| 9,500,453 B2 | 11/2016 | Schluckebier et al. |
| 9,506,735 B1 | 11/2016 | Burrow |
| D774,824 S | 12/2016 | Gallagher |
| 9,513,096 B2 | 12/2016 | Burrow |
| 9,518,810 B1 | 12/2016 | Burrow |
| 9,523,563 B1 | 12/2016 | Burrow |
| 9,528,799 B2 | 12/2016 | Maljkovic |
| 9,546,849 B2 | 1/2017 | Burrow |
| 9,551,557 B1 | 1/2017 | Burrow |
| D778,391 S | 2/2017 | Burrow |
| D778,393 S | 2/2017 | Burrow |
| D778,394 S | 2/2017 | Burrow |
| D778,395 S | 2/2017 | Burrow |
| D779,021 S | 2/2017 | Burrow |
| D779,024 S | 2/2017 | Burrow |
| D780,283 S | 2/2017 | Burrow |
| 9,587,918 B2 | 3/2017 | Burrow |
| 9,599,443 B2 | 3/2017 | Padgett et al. |
| 9,625,241 B2 | 4/2017 | Neugebauer |
| 9,631,907 B2 | 4/2017 | Burrow |
| 9,644,930 B1 | 5/2017 | Burrow |
| 9,658,042 B2 | 5/2017 | Emary |
| 9,683,818 B2 | 6/2017 | Lemke et al. |
| D792,200 S | 7/2017 | Baiz et al. |
| 9,709,368 B2 | 7/2017 | Mahnke |
| D797,880 S | 9/2017 | Seecamp |
| 9,759,554 B2 | 9/2017 | Ng et al. |
| D800,244 S | 10/2017 | Burczynski et al. |
| D800,245 S | 10/2017 | Burczynski et al. |
| D800,246 S | 10/2017 | Burczynski et al. |
| 9,784,667 B2 | 10/2017 | Lukay et al. |
| 9,835,423 B2 | 12/2017 | Burrow |
| 9,835,427 B2 | 12/2017 | Burrow |
| 9,857,151 B2 | 1/2018 | Dionne et al. |
| 9,869,536 B2 | 1/2018 | Burrow |
| 9,879,954 B2 | 1/2018 | Hajar |
| 9,885,551 B2 | 2/2018 | Burrow |
| D813,975 S | 3/2018 | White |
| 9,921,040 B2 | 3/2018 | Rubin |
| 9,927,219 B2 | 3/2018 | Burrow |
| 9,933,241 B2 | 4/2018 | Burrow |
| 9,939,236 B2 | 4/2018 | Drobockyi et al. |
| 9,964,388 B1 | 5/2018 | Burrow |
| D821,536 S | 6/2018 | Christiansen et al. |
| 9,989,339 B2 | 6/2018 | Riess |
| 10,041,770 B2 | 8/2018 | Burrow |
| 10,041,771 B1 | 8/2018 | Burrow |
| 10,041,776 B1 | 8/2018 | Burrow |
| 10,041,777 B1 | 8/2018 | Burrow |
| 10,048,049 B2 | 8/2018 | Burrow |
| 10,048,050 B1 | 8/2018 | Burrow |
| 10,048,052 B2 | 8/2018 | Burrow |
| 10,054,413 B1 | 8/2018 | Burrow |
| D828,483 S | 9/2018 | Burrow |
| 10,081,057 B2 * | 9/2018 | Burrow ............... B22F 3/24 |
| D832,037 S | 10/2018 | Gallagher |
| 10,101,140 B2 | 10/2018 | Burrow |
| 10,124,343 B2 | 11/2018 | Tsai |
| 10,145,662 B2 | 12/2018 | Burrow |
| 10,190,857 B2 | 1/2019 | Burrow |
| 10,234,249 B2 | 3/2019 | Burrow |
| 10,234,253 B2 | 3/2019 | Burrow |
| 10,240,905 B2 | 3/2019 | Burrow |
| 10,254,096 B2 | 4/2019 | Burrow |
| 10,260,847 B2 | 4/2019 | Viggiano et al. |
| D849,181 S | 5/2019 | Burrow |
| 10,302,403 B2 | 5/2019 | Burrow |
| 10,302,404 B2 | 5/2019 | Burrow |
| 10,323,918 B2 | 6/2019 | Menefee, III |
| 10,330,451 B2 | 6/2019 | Burrow |
| 10,345,088 B2 | 7/2019 | Burrow |

(56) References Cited

U.S. PATENT DOCUMENTS

| | | |
|---|---|---|
| 10,352,664 B2 | 7/2019 | Burrow |
| 10,352,670 B2 | 7/2019 | Burrow |
| 10,359,262 B2 | 7/2019 | Burrow |
| 10,365,074 B2 | 7/2019 | Burrow |
| D861,118 S | 9/2019 | Burrow |
| D861,119 S | 9/2019 | Burrow |
| 10,408,582 B2 | 9/2019 | Burrow |
| 10,408,592 B2 | 9/2019 | Boss et al. |
| 10,415,943 B2 | 9/2019 | Burrow |
| 10,429,156 B2 | 10/2019 | Burrow |
| 10,458,762 B2 | 10/2019 | Burrow |
| 10,466,020 B2 | 11/2019 | Burrow |
| 10,466,021 B2 | 11/2019 | Burrow |
| 10,480,911 B2 | 11/2019 | Burrow |
| 10,480,912 B2 | 11/2019 | Burrow |
| 10,480,915 B2 | 11/2019 | Burrow et al. |
| 10,488,165 B2 | 11/2019 | Burrow |
| 10,533,830 B2 | 1/2020 | Burrow et al. |
| 10,571,162 B2 | 2/2020 | Makansi et al. |
| 10,571,228 B2 | 2/2020 | Burrow |
| 10,571,229 B2 | 2/2020 | Burrow |
| 10,571,230 B2 | 2/2020 | Burrow |
| 10,571,231 B2 | 2/2020 | Burrow |
| 10,578,409 B2 | 3/2020 | Burrow |
| 10,591,260 B2 | 3/2020 | Burrow et al. |
| D882,019 S | 4/2020 | Burrow et al. |
| D882,020 S | 4/2020 | Burrow et al. |
| D882,021 S | 4/2020 | Burrow et al. |
| D882,022 S | 4/2020 | Burrow et al. |
| D882,023 S | 4/2020 | Burrow et al. |
| D882,024 S | 4/2020 | Burrow et al. |
| D882,025 S | 4/2020 | Burrow et al. |
| D882,026 S | 4/2020 | Burrow et al. |
| D882,027 S | 4/2020 | Burrow et al. |
| D882,028 S | 4/2020 | Burrow et al. |
| D882,029 S | 4/2020 | Burrow et al. |
| D882,030 S | 4/2020 | Burrow et al. |
| D882,031 S | 4/2020 | Burrow et al. |
| D882,032 S | 4/2020 | Burrow et al. |
| D882,033 S | 4/2020 | Burrow et al. |
| D882,720 S | 4/2020 | Burrow et al. |
| D882,721 S | 4/2020 | Burrow et al. |
| D882,722 S | 4/2020 | Burrow et al. |
| D882,723 S | 4/2020 | Burrow et al. |
| D882,724 S | 4/2020 | Burrow et al. |
| 10,612,896 B2 | 4/2020 | Burrow |
| 10,612,897 B2 | 4/2020 | Burrow et al. |
| D884,115 S | 5/2020 | Burrow et al. |
| D886,231 S | 6/2020 | Burrow et al. |
| D886,937 S | 6/2020 | Burrow et al. |
| 10,677,573 B2 | 6/2020 | Burrow et al. |
| D891,567 S | 7/2020 | Burrow et al. |
| D891,568 S | 7/2020 | Burrow et al. |
| D891,569 S | 7/2020 | Burrow et al. |
| D891,570 S | 7/2020 | Burrow et al. |
| 10,704,869 B2 | 7/2020 | Burrow et al. |
| 10,704,870 B2 | 7/2020 | Burrow et al. |
| 10,704,871 B2 | 7/2020 | Burrow et al. |
| 10,704,872 B1 | 7/2020 | Burrow et al. |
| 10,704,876 B2 | 7/2020 | Boss et al. |
| 10,704,877 B2 | 7/2020 | Boss et al. |
| 10,704,878 B2 | 7/2020 | Boss et al. |
| 10,704,879 B1 | 7/2020 | Burrow et al. |
| 10,704,880 B1 | 7/2020 | Burrow et al. |
| D892,258 S | 8/2020 | Burrow et al. |
| D893,665 S | 8/2020 | Burrow et al. |
| D893,666 S | 8/2020 | Burrow et al. |
| D893,667 S | 8/2020 | Burrow et al. |
| D893,668 S | 8/2020 | Burrow et al. |
| D894,320 S | 8/2020 | Burrow et al. |
| 10,731,956 B2 | 8/2020 | Burrow et al. |
| 10,731,957 B1 | 8/2020 | Burrow et al. |
| 10,753,713 B2 | 8/2020 | Burrow et al. |
| 10,760,882 B1 | 9/2020 | Burrow |
| 10,782,107 B1 | 9/2020 | Dindl |
| 10,794,671 B2 | 10/2020 | Padgett et al. |
| 10,809,043 B2 | 10/2020 | Padgett et al. |
| D903,038 S | 11/2020 | Burrow et al. |
| D903,039 S | 11/2020 | Burrow et al. |
| 10,845,169 B2 | 11/2020 | Burrow |
| 10,852,108 B2 | 12/2020 | Burrow et al. |
| 10,859,352 B2 | 12/2020 | Burrow |
| 10,871,361 B2 | 12/2020 | Skowron et al. |
| 10,876,822 B2 | 12/2020 | Burrow et al. |
| 10,900,760 B2 | 1/2021 | Burrow |
| 10,907,944 B2 | 2/2021 | Burrow |
| 10,914,558 B2 | 2/2021 | Burrow |
| 10,921,100 B2 | 2/2021 | Burrow et al. |
| 10,921,101 B2 | 2/2021 | Burrow et al. |
| 10,921,106 B2 | 2/2021 | Burrow et al. |
| D913,403 S | 3/2021 | Burrow et al. |
| 10,948,272 B1 | 3/2021 | Drobockyi et al. |
| 10,948,273 B2 | 3/2021 | Burrow et al. |
| 10,948,275 B2 | 3/2021 | Burrow |
| 10,962,338 B2 | 3/2021 | Burrow |
| 10,976,144 B1 | 4/2021 | Peterson et al. |
| 10,996,029 B2 | 5/2021 | Burrow |
| 10,996,030 B2 | 5/2021 | Burrow |
| 11,047,654 B1 | 6/2021 | Burrow |
| 11,047,655 B2 | 6/2021 | Burrow et al. |
| 11,047,661 B2 | 6/2021 | Burrow |
| 11,047,662 B2 | 6/2021 | Burrow |
| 11,047,663 B1 | 6/2021 | Burrow |
| 11,047,664 B2 | 6/2021 | Burrow |
| 11,079,205 B2 | 8/2021 | Burrow et al. |
| 11,079,209 B2 | 8/2021 | Burrow |
| 11,085,739 B2 | 8/2021 | Burrow |
| 11,085,740 B2 | 8/2021 | Burrow |
| 11,085,741 B2 | 8/2021 | Burrow |
| 11,085,742 B2 | 8/2021 | Burrow |
| 11,092,413 B2 | 8/2021 | Burrow |
| 11,098,990 B2 | 8/2021 | Burrow |
| 11,098,991 B2 | 8/2021 | Burrow |
| 11,098,992 B2 | 8/2021 | Burrow |
| 11,098,993 B2 | 8/2021 | Burrow |
| 11,112,224 B2 | 9/2021 | Burrow et al. |
| 11,112,225 B2 | 9/2021 | Burrow et al. |
| 11,118,875 B1 | 9/2021 | Burrow |
| 11,118,876 B2 | 9/2021 | Burrow et al. |
| 11,118,877 B2 | 9/2021 | Burrow et al. |
| 11,118,882 B2 | 9/2021 | Burrow |
| 11,125,540 B2 | 9/2021 | Pennell et al. |
| 11,209,251 B2 | 12/2021 | Burrow et al. |
| 11,209,252 B2 | 12/2021 | Burow |
| 11,209,256 B2 | 12/2021 | Burrow et al. |
| 11,215,430 B2 | 1/2022 | Boss et al. |
| 11,226,179 B2 | 1/2022 | Burrow |
| 2003/0127011 A1 | 7/2003 | Mackerell et al. |
| 2004/0074412 A1 | 4/2004 | Kightlinger |
| 2005/0257712 A1 | 11/2005 | Husseini et al. |
| 2006/0027125 A1 | 2/2006 | Brunn |
| 2006/0278116 A1 | 12/2006 | Hunt |
| 2006/0283345 A1 | 12/2006 | Feldman et al. |
| 2007/0056343 A1 | 3/2007 | Cremonesi |
| 2007/0181029 A1 | 8/2007 | Mcaninch |
| 2007/0214993 A1 | 9/2007 | Cerovic et al. |
| 2010/0234132 A1 | 9/2010 | Hirsch et al. |
| 2010/0275762 A1* | 11/2010 | Koch .......... F42B 33/002 86/24 |
| 2011/0179965 A1 | 7/2011 | Mason |
| 2012/0060716 A1 | 3/2012 | Davies et al. |
| 2012/0180685 A1 | 7/2012 | Se-Hong |
| 2012/0291655 A1 | 11/2012 | Jones |
| 2013/0014664 A1 | 1/2013 | Padgett |
| 2013/0014665 A1 | 1/2013 | Maljkovic et al. |
| 2013/0076865 A1 | 3/2013 | Tateno et al. |
| 2013/0186294 A1 | 7/2013 | Davies et al. |
| 2013/0291711 A1 | 11/2013 | Mason |
| 2014/0075805 A1 | 3/2014 | LaRue |
| 2014/0260925 A1 | 9/2014 | Beach et al. |
| 2014/0261044 A1 | 9/2014 | Seecamp |
| 2014/0311332 A1 | 10/2014 | Carlson et al. |
| 2015/0226220 A1 | 8/2015 | Bevington |
| 2015/0268020 A1 | 9/2015 | Emary |

(56) References Cited

U.S. PATENT DOCUMENTS

| | | |
|---|---|---|
| 2015/0316420 A1* | 11/2015 | Englert .............. F42B 8/08 374/179 |
| 2016/0003589 A1 | 1/2016 | Burrow |
| 2016/0003590 A1 | 1/2016 | Burrow |
| 2016/0003593 A1 | 1/2016 | Burrow |
| 2016/0003594 A1 | 1/2016 | Burrow |
| 2016/0003595 A1 | 1/2016 | Burrow |
| 2016/0003596 A1 | 1/2016 | Burrow |
| 2016/0003597 A1 | 1/2016 | Burrow |
| 2016/0003601 A1 | 1/2016 | Burrow |
| 2016/0033241 A1 | 2/2016 | Burrow |
| 2016/0102030 A1 | 4/2016 | Coffey et al. |
| 2016/0146585 A1 | 5/2016 | Padgett |
| 2016/0245626 A1 | 8/2016 | Drieling et al. |
| 2016/0349022 A1 | 12/2016 | Burrow |
| 2016/0349023 A1 | 12/2016 | Burrow |
| 2016/0349028 A1 | 12/2016 | Burrow |
| 2016/0356588 A1 | 12/2016 | Burrow |
| 2016/0377399 A1 | 12/2016 | Burrow |
| 2017/0030690 A1 | 2/2017 | Viggiano et al. |
| 2017/0080498 A1 | 3/2017 | Burrow |
| 2017/0082409 A1 | 3/2017 | Burrow |
| 2017/0082411 A1 | 3/2017 | Burrow |
| 2017/0089673 A1 | 3/2017 | Burrow |
| 2017/0089674 A1 | 3/2017 | Burrow |
| 2017/0089675 A1 | 3/2017 | Burrow |
| 2017/0089679 A1 | 3/2017 | Burrow |
| 2017/0153099 A9 | 6/2017 | Burrow |
| 2017/0205217 A9 | 7/2017 | Burrow |
| 2017/0299352 A9 | 10/2017 | Burrow |
| 2017/0328689 A1 | 11/2017 | Dindl |
| 2018/0066925 A1 | 3/2018 | Skowron et al. |
| 2018/0106581 A1 | 4/2018 | Rogers |
| 2018/0224252 A1 | 8/2018 | O'Rourke |
| 2018/0224253 A1 | 8/2018 | Burrow |
| 2018/0224256 A1 | 8/2018 | Burrow |
| 2018/0259310 A1 | 9/2018 | Burrow |
| 2018/0306558 A1 | 10/2018 | Padgett et al. |
| 2019/0011232 A1 | 1/2019 | Boss et al. |
| 2019/0011233 A1 | 1/2019 | Boss et al. |
| 2019/0011234 A1 | 1/2019 | Boss et al. |
| 2019/0011235 A1 | 1/2019 | Boss et al. |
| 2019/0011236 A1 | 1/2019 | Burrow |
| 2019/0011237 A1 | 1/2019 | Burrow |
| 2019/0011238 A1 | 1/2019 | Burrow |
| 2019/0011239 A1 | 1/2019 | Burrow |
| 2019/0011240 A1 | 1/2019 | Burrow |
| 2019/0011241 A1 | 1/2019 | Burrow |
| 2019/0025019 A1 | 1/2019 | Burrow |
| 2019/0025020 A1 | 1/2019 | Burrow |
| 2019/0025021 A1 | 1/2019 | Burrow |
| 2019/0025022 A1 | 1/2019 | Burrow |
| 2019/0025023 A1 | 1/2019 | Burrow |
| 2019/0025024 A1 | 1/2019 | Burrow |
| 2019/0025025 A1 | 1/2019 | Burrow |
| 2019/0025026 A1 | 1/2019 | Burrow |
| 2019/0025035 A1 | 1/2019 | Burrow |
| 2019/0025036 A1 | 1/2019 | Burrow |
| 2019/0078862 A1 | 3/2019 | Burrow |
| 2019/0106364 A1 | 4/2019 | James |
| 2019/0107375 A1 | 4/2019 | Burrow |
| 2019/0137228 A1 | 5/2019 | Burrow et al. |
| 2019/0137229 A1 | 5/2019 | Burrow et al. |
| 2019/0137230 A1 | 5/2019 | Burrow et al. |
| 2019/0137231 A1 | 5/2019 | Burrow et al. |
| 2019/0137232 A1 | 5/2019 | Burrow et al. |
| 2019/0137233 A1 | 5/2019 | Burrow et al. |
| 2019/0137234 A1 | 5/2019 | Burrow et al. |
| 2019/0137235 A1 | 5/2019 | Burrow et al. |
| 2019/0137236 A1 | 5/2019 | Burrow et al. |
| 2019/0137237 A1 | 5/2019 | Burrow et al. |
| 2019/0137238 A1 | 5/2019 | Burrow et al. |
| 2019/0137239 A1 | 5/2019 | Burrow et al. |
| 2019/0137240 A1 | 5/2019 | Burrow et al. |
| 2019/0137241 A1 | 5/2019 | Burrow et al. |
| 2019/0137242 A1 | 5/2019 | Burrow et al. |
| 2019/0137243 A1 | 5/2019 | Burrow et al. |
| 2019/0137244 A1 | 5/2019 | Burrow et al. |
| 2019/0170488 A1 | 6/2019 | Burrow |
| 2019/0204050 A1 | 7/2019 | Burrow |
| 2019/0204056 A1 | 7/2019 | Burrow |
| 2019/0212117 A1 | 7/2019 | Burrow |
| 2019/0242679 A1 | 8/2019 | Viggiano et al. |
| 2019/0242682 A1 | 8/2019 | Burrow |
| 2019/0242683 A1 | 8/2019 | Burrow |
| 2019/0257625 A1 | 8/2019 | Burrow |
| 2019/0285391 A1 | 9/2019 | Menefee, III |
| 2019/0310058 A1 | 10/2019 | Burrow |
| 2019/0310059 A1 | 10/2019 | Burrow |
| 2019/0316886 A1 | 10/2019 | Burrow |
| 2019/0360788 A1 | 11/2019 | Burrow |
| 2019/0376773 A1 | 12/2019 | Burrow |
| 2019/0376774 A1 | 12/2019 | Boss et al. |
| 2019/0383590 A1 | 12/2019 | Burrow |
| 2019/0390929 A1 | 12/2019 | Libotte |
| 2020/0011645 A1 | 1/2020 | Burrow et al. |
| 2020/0011646 A1 | 1/2020 | Burrow et al. |
| 2020/0025536 A1 | 1/2020 | Burrow et al. |
| 2020/0025537 A1 | 1/2020 | Burrow et al. |
| 2020/0033102 A1 | 1/2020 | Burrow |
| 2020/0033103 A1 | 1/2020 | Burrow et al. |
| 2020/0041239 A1 | 2/2020 | Burrow |
| 2020/0049469 A1 | 2/2020 | Burrow |
| 2020/0049470 A1 | 2/2020 | Burrow |
| 2020/0049471 A1 | 2/2020 | Burrow |
| 2020/0049472 A1 | 2/2020 | Burrow |
| 2020/0049473 A1 | 2/2020 | Burrow |
| 2020/0056872 A1 | 2/2020 | Burrow |
| 2020/0109932 A1 | 4/2020 | Burrow |
| 2020/0149853 A1 | 5/2020 | Burrow |
| 2020/0158483 A1 | 5/2020 | Burrow |
| 2020/0200512 A1 | 6/2020 | Burrow |
| 2020/0200513 A1 | 6/2020 | Burrow |
| 2020/0208948 A1 | 7/2020 | Burrow |
| 2020/0208949 A1 | 7/2020 | Burrow |
| 2020/0208950 A1 | 7/2020 | Burrow |
| 2020/0225009 A1 | 7/2020 | Burrow |
| 2020/0248998 A1 | 8/2020 | Burrow |
| 2020/0248999 A1 | 8/2020 | Burrow |
| 2020/0249000 A1 | 8/2020 | Burrow |
| 2020/0256654 A1* | 8/2020 | Burrow ............... F42B 14/061 |
| 2020/0263962 A1 | 8/2020 | Burrow et al. |
| 2020/0263967 A1 | 8/2020 | Burrow et al. |
| 2020/0278183 A1 | 9/2020 | Burrow et al. |
| 2020/0292283 A1 | 9/2020 | Burrow |
| 2020/0300587 A1 | 9/2020 | Burrow et al. |
| 2020/0300592 A1 | 9/2020 | Overton et al. |
| 2020/0309490 A1 | 10/2020 | Burrow et al. |
| 2020/0309496 A1 | 10/2020 | Burrow et al. |
| 2020/0318937 A1 | 10/2020 | Skowron et al. |
| 2020/0326168 A1 | 10/2020 | Boss et al. |
| 2020/0363172 A1 | 11/2020 | Koh et al. |
| 2020/0363173 A1 | 11/2020 | Burrow |
| 2020/0363179 A1 | 11/2020 | Overton et al. |
| 2020/0378734 A1 | 12/2020 | Burrow |
| 2020/0393220 A1 | 12/2020 | Burrow |
| 2020/0400411 A9 | 12/2020 | Burrow |
| 2021/0003373 A1 | 1/2021 | Burrow |
| 2021/0041211 A1 | 2/2021 | Pennell et al. |
| 2021/0041212 A1 | 2/2021 | Burrow et al. |
| 2021/0041213 A1 | 2/2021 | Padgett |
| 2021/0072006 A1 | 3/2021 | Padgett et al. |
| 2021/0080236 A1 | 3/2021 | Burrow |
| 2021/0080237 A1 | 3/2021 | Burrow et al. |
| 2021/0108898 A1 | 4/2021 | Overton et al. |
| 2021/0108899 A1 | 4/2021 | Burrow et al. |
| 2021/0123709 A1 | 4/2021 | Burrow et al. |
| 2021/0131772 A1 | 5/2021 | Burrow |
| 2021/0131773 A1 | 5/2021 | Burrow |
| 2021/0131774 A1 | 5/2021 | Burrow |
| 2021/0140749 A1 | 5/2021 | Burrow |
| 2021/0148681 A1 | 5/2021 | Burrow |
| 2021/0148682 A1 | 5/2021 | Burrow |
| 2021/0148683 A1 | 5/2021 | Burrow et al. |

(56) References Cited

U.S. PATENT DOCUMENTS

| | | |
|---|---|---|
| 2021/0156653 A1 | 5/2021 | Burrow et al. |
| 2021/0164762 A1 | 6/2021 | Burrow et al. |
| 2021/0223017 A1 | 7/2021 | Peterson et al. |
| 2021/0254939 A1 | 8/2021 | Burrow |
| 2021/0254940 A1 | 8/2021 | Burrow |
| 2021/0254941 A1 | 8/2021 | Burrow |
| 2021/0254942 A1 | 8/2021 | Burrow |
| 2021/0254943 A1 | 8/2021 | Burrow |
| 2021/0254944 A1 | 8/2021 | Burrow |
| 2021/0254945 A1 | 8/2021 | Burrow |
| 2021/0254946 A1 | 8/2021 | Burrow |
| 2021/0254947 A1 | 8/2021 | Burrow |
| 2021/0254948 A1 | 8/2021 | Burrow |
| 2021/0254949 A1 | 8/2021 | Burrow |
| 2021/0270579 A1 | 9/2021 | Burrow |
| 2021/0270580 A1 | 9/2021 | Burrow |
| 2021/0270581 A1 | 9/2021 | Burrow |
| 2021/0270582 A1 | 9/2021 | Burrow |
| 2021/0270588 A1 | 9/2021 | Burrow et al. |
| 2021/0278179 A1 | 9/2021 | Burrow et al. |
| 2021/0302136 A1 | 9/2021 | Burrow |
| 2021/0302137 A1 | 9/2021 | Burrow |
| 2021/0325156 A1 | 10/2021 | Burrow |
| 2021/0325157 A1 | 10/2021 | Burrow |
| 2021/0333073 A1 | 10/2021 | Burrow et al. |
| 2021/0333075 A1 | 10/2021 | Burrow |
| 2021/0341266 A1 | 11/2021 | Burrow |
| 2021/0341267 A1 | 11/2021 | Burrow |
| 2021/0341268 A1 | 11/2021 | Burrow |
| 2021/0341269 A1 | 11/2021 | Burrow |
| 2021/0341270 A1 | 11/2021 | Burrow |
| 2021/0341271 A1 | 11/2021 | Burrow |
| 2021/0341272 A1 | 11/2021 | Burrow |
| 2021/0341273 A1 | 11/2021 | Burrow |
| 2021/0348892 A1 | 11/2021 | Burrow |
| 2021/0348893 A1 | 11/2021 | Burrow |
| 2021/0348894 A1 | 11/2021 | Burrow |
| 2021/0348895 A1 | 11/2021 | Burrow |
| 2021/0348902 A1 | 11/2021 | Burrow |
| 2021/0348903 A1 | 11/2021 | Burrow |
| 2021/0348904 A1 | 11/2021 | Burrow |
| 2021/0364257 A1 | 11/2021 | Burrow et al. |
| 2021/0364258 A1 | 11/2021 | Burrow et al. |
| 2021/0372747 A1 | 12/2021 | Burrow |
| 2021/0372748 A1 | 12/2021 | Burrow et al. |
| 2021/0372749 A1 | 12/2021 | Burrow et al. |
| 2021/0372750 A1 | 12/2021 | Burrow et al. |
| 2021/0372751 A1 | 12/2021 | Burrow et al. |
| 2021/0372754 A1 | 12/2021 | Burrow |
| 2021/0381813 A1 | 12/2021 | Burrow |
| 2021/0389106 A1 | 12/2021 | Burrow |
| 2022/0011083 A1 | 1/2022 | Burrow |

FOREIGN PATENT DOCUMENTS

| | | |
|---|---|---|
| DE | 16742 C | 1/1882 |
| EP | 2625486 A4 | 8/2017 |
| FR | 1412414 A | 10/1965 |
| GB | 574877 A | 1/1946 |
| GB | 783023 A | 9/1957 |
| RU | 2172467 C1 | 8/2001 |
| WO | 0034732 | 6/2000 |
| WO | 2007014024 A2 | 2/2007 |
| WO | 2012047615 A1 | 4/2012 |
| WO | 2012097320 A1 | 7/2012 |
| WO | 2012097317 A3 | 11/2012 |
| WO | 2013070250 A1 | 5/2013 |
| WO | 2013096848 A1 | 6/2013 |
| WO | 2014062256 A2 | 4/2014 |
| WO | 2016003817 A1 | 1/2016 |
| WO | 2019094544 A1 | 5/2019 |
| WO | 2019160742 A2 | 8/2019 |
| WO | 2020197868 A3 | 11/2020 |
| WO | 2021040903 A2 | 3/2021 |

OTHER PUBLICATIONS

International Preliminary Report on Patentability and Written Opinion in PCT/US2018/059748 dated May 12, 2020; pp. 1-8.
International Search Report and Written Opinion for PCTUS201859748 dated Mar. 1, 2019, pp. 1-9.
International Search Report and Written Opinion for PCTUS2019017085 dated Apr. 19, 2019, pp. 1-9.
AccurateShooter.com Daily Bulletin "New PolyCase Ammunition and Injection-Molded Bullets" Jan. 11, 2015.
Korean Intellectual Property Office (ISA), International Search Report and Written Opinion for PCT/US2011/062781 dated Nov. 30, 2012, 16 pp.
Korean Intellectual Property Office (ISA), International Search Report and Written Opinion for PCT/US2015/038061 dated Sep. 21, 2015, 28 pages.
International Search Report and Written Opinion in PCT/US2019/040323 dated Sep. 24, 2019, pp. 1-16.
International Search Report and Written Opinion in PCT/US2019/040329 dated Sep. 27, 2019, pp. 1-24.
EESR dated Jul. 29, 2021, pp. 1-9.
EESR dated Jul. 8, 2021, pp. 1-9.
International Search Report and Written Opinion in PCT/US2020/023273 dated Oct. 7, 2020; pp. 1-11.
IPRP in PCT2019017085 dated Aug. 27, 2020, pp. 1-8.
International Ammunition Association, Inc. website, published on Apr. 2017, PCP Ammo Variation in U.S. Military Polymer/Metal Cartridge Case R&D, Available on the Internet URL https://forum.cartridgecollectors.org/t/pcp-ammo-variation-in-u-s-military-polyer-metal-cartridge-case-r-d/24400.
Luck Gunner.com, Review: Polymer Cased Rifle Ammunition from PCP Ammo, Published Jan. 6, 2014, Available on the Internet URL https://www.luckygunner.com/lounge/pcp-ammo-review.
YouTube.com—TFB TV, Published on Jul. 23, 2015, available on Internal URL https://www.youtubecom/watch?v=mCjNkbxHkEE.

* cited by examiner

DEVICE AND METHOD OF DETERMINING THE FORCE REQUIRED TO REMOVE A PROJECTILE FROM AN AMMUNITION CARTRIDGE

CROSS-REFERENCE TO RELATED APPLICATIONS

This application claims priority based on U.S. Provisional Application No. 62/630,515, filed Feb. 14, 2018. The contents of which is incorporated by reference in its entirety.

TECHNICAL FIELD OF THE INVENTION

The present invention relates in general to the field of ammunition production and certification, specifically to new and improved devices and methods for certification and standardization of ammunition.

STATEMENT OF FEDERALLY FUNDED RESEARCH

None.

INCORPORATION-BY-REFERENCE OF MATERIALS FILED ON COMPACT DISC

None.

BACKGROUND OF THE INVENTION

During the process of loading ammunition cartridges, a projectile is inserted into a cartridge and secured therein, generally by crimping the cartridge neck to the shank of the bullet securely enough that the bullet will not inadvertently separate or dislodged from the cartridge, but will be separated by the explosive force of the charge when fired. Current devices to separate a bullet from a brass cartridge use collet type clamps that forcefully seize the bullet with a multiplicity of jaws at one end and at the other end secure the cartridge at the cartridge head by securing the rim or extractor groove. The bullet is then separated from the cartridge.

For example, U.S. Pat. No. 7,568,417, entitled, "Device and method for pulling bullets from cartridges," discloses a device for use with an ammunition reloading press, the device uses a "C" shaped split ring that is captured within a chamber with a slightly tapered frustaconical wall into the smaller end of which the bullet portion of an ammunition round can be inserted to a point where the bullet enters the C ring with a friction fit and subsequent withdrawal of the ammunition cartridge by operation of the press draws the ring into the increasingly narrow wall, decreasing the diameter of the ring and forcing a tighter grip on the bullet, which is then separated from the cartridge by further withdrawal and is removable from the device through an opening at the larger end of the chamber.

Similarly, U.S. Pat. No. 5,333,367, entitled, "Bullet Puller," discloses an inertial bullet puller comprising a rigid tough transparent plastics material carrier tube having an opening at its upper end adapted to receive a cartridge and a head portion at its lower end adapted to be struck against a hard surface. The carrier tube is affixed to the end of a handle in a manner similar to the construction of a hammer. However, the carrier tube is not completely perpendicular to the handle, but instead, resides at an angle to the handle. At the upper end of the carrier tube is disposed an annular segmented cartridge support. A cap at the upper end of the carrier tube having a tapered inner end provides a cam surface for positively moving the annular segmented cartridge support radially inwardly and holding it in position. When a cartridge is inserted through the annular segmented cartridge support into the opening at the upper end of the tube, the cartridge support expands to pass the larger diameter portions of the cartridge, and then as the cap is tightened, the cartridge support contracts into the cannelure. In use the lower end of the tube is struck once or twice against a hard surface until the bullet is observed to pull free of the cartridge case. The lower end of the tube is closed forming a pocket to receive the bullet and case contents when the bullet is freed from the case. Tapered surfaces on the interior of the cartridge support allows the cartridge support to move radially outward when the cap is backed off, and the cartridge components are shaken out of the upper end of the carrier tube. However current bullet removal devices are developed for brass ammunition cartridges and are not applicable to polymer cartridges given the unique properties of polymer relative to brass.

BRIEF SUMMARY OF THE INVENTION

The present invention provides a device and methods to determine the amount of force necessary to remove a bullet from an ammunition cartridge using a housing that approximates the chamber of a gun.

The present invention provides a method of determining the amount of force necessary to remove a projectile from an ammunition cartridge. This force equates to the retention force of the projectile in the ammunition cartridge. This value can be retained and compared to other values to ensure consistent lot to lot quality, it can be used to compare to different types of ammunition and/or it can be used as an internal quality control. The present invention provides a method of determining the amount of force necessary to remove a projectile from a cartridge by providing a testing device. The testing device comprises at least 2 separate portions, a chamber housing and a bullet clamp. The testing device also includes a secured mount and a movable mount in communication with a sensor to measure the amount of force applied to separate the secured mount and a movable mount. A recording means is also in communication therewith to record the sample, force and other parameters for retention. A display can also be in communication therewith, to display graphical and/or numerical data. The chamber housing is secured to the secured mount and the bullet clamping device is attached to the movable mount (although these connections may be reversed). The chamber housing includes a body member with a central bore that extends vertically through the body member between the upper housing end and the lower housing end. The central bore generally has the profile of an ammunition cartridge to accommodate the ammunition. The central bore has a shoulder region with a frustaconical shape near the upper housing end that reduces the inner diameter. The shoulder region is connected to a neck region that further reduces the inner diameter and terminates at a cartridge retention lip that extends around the upper aperture. The cartridge retention lip contacts the projectile aperture of the cartridge to resist the force being applied to the projectile. The chamber housing is attached to the testing device by a mounting means. The mounting means can be any means necessary to connect the chamber housing to the testing equipment. For example, the lower end may include a threaded adaptor that threads to the secured mount, the chamber housing may thread directly to the secured mount, locking pins may be used to secure the chamber housing to the secured mount, tong and groove configurations may be used to secure the chamber housing to the secured mount and other means known to the skilled artisan may be used as necessary. The bullet clamp can be connected to the movable mount to separate the bullet from the ammunition cartridge. Although the bullet clamp can be any means that secures the projectile to the bullet clamp the common means includes a collet, a clamp, a vice, or chuck.

In operation, once the chamber housing is attached to the testing device and the bullet clamp was been connected to the movable mount, the ammunition cartridge maybe insert into the device for testing. The ammunition is positioned in the a central bore such that the frustaconical shape of the shoulder region of the central bore mates to the shoulder of the ammunition and the neck length and diameter of the central bore allow the cartridge retention lip 27 to contact the projectile aperture of the ammunition with the bullet extending through the upper aperture of the chamber housing. The bullet clamp can then be positioned to accept the bullet and secure the bullet immovably. The testing device is then activated to apply and measure the force necessary to move the bullet clamp from the chamber housing and in-turn measure the force necessary to remove the bullet. This bullet pull value can then be recorded, compared to other lots, manufactures, rounds, etc.

The chamber housing includes a body member with that extends vertically through the body member between the upper housing end and the lower housing end. The central bore generally has the profile of an ammunition cartridge to accommodate the ammunition. The central bore has a shoulder region with a frustaconical shape near the upper housing end that reduces the inner diameter. The shoulder region is connected to a neck region that further reduces the inner diameter and terminates at a cartridge retention lip that extends around the upper aperture. The cartridge retention lip contacts the projectile aperture of the cartridge to resist the force being applied to the projectile. The chamber housing is attached to the testing device by a mounting means. The mounting means can be any means necessary to connect the chamber housing to the testing equipment. For example, the lower end may include a threaded adaptor that threads to the secured mount, the chamber housing may thread directly to the secured mount, locking pins may be used to secure the chamber housing to the secured mount, tong and groove configurations may be used to secure the chamber housing to the secured mount and other means known to the skilled artisan may be used as necessary. The bullet clamp can be connected to the movable mount to separate the bullet from the ammunition cartridge. Although the bullet clamp can be any means that secures the projectile to the bullet clamp the common means includes a collet, a clamp, a vice, or chuck. The ammunition may include .22, .22-250, .223, .243, .25-06, .270, .277, .300, .30-30, .30-40, 30.06, .300, .303, .308, .338, .357, .38, .380, .40, .44, .45, .45-70, .50 BMG, 5.45 mm, 5.56 mm, 6.5 mm, 6.8 mm, 7 mm, 7.62 mm, 8 mm, 9 mm, 10 mm, 12.7 mm, 14.5 mm, 20 mm, 25 mm, 30 mm, 40 mm and others.

The present invention provides a device for determining the force necessary for the separation of a bullet from an ammunition cartridge comprising: a chamber housing having a central bore extending from a lower housing end to an upper housing end and terminating at a upper aperture through the upper housing end, wherein the central bore comprises a chamber diameter adapted to accept an ammunition cartridge and that the bullet partially extends from the upper aperture; a frustaconical shape shoulder in the central bore at the upper housing end to reduce the chamber diameter to mate to an ammunition cartridge shoulder; a neck that connects the upper aperture to the frustaconical shape shoulder adapted to accept an ammunition cartridge neck; a cartridge retention lip within the upper aperture adapted to contact an ammunition cartridge bullet aperture; a chamber mount adapted to connect the chamber housing to a testing device surface; a bullet securing device comprising a bullet securing end to secure the bullet and a bullet securing device mount adapted to connect to the testing device; a moving mechanism to move the bullet securing device away from the chamber housing; a sensor in communication with the moving mechanism to measure a force exerted by the moving mechanism; and a display in communication with the sensor to display and or record the force. The device may include a chamber mount that attaches to a platform. The device may include a chamber mount that comprises a housing adaptor that connects the chamber mount to a platform. The device may include a bullet securing device comprising a collet, a clamp, a vice, chuck, or any other mechanism. The central bore accepts a caliber selected from 17, 22, .22-250, .223, .243, .25-06, .270, .300, .30-30, .30-40, 30.06, .300, .303, .308, .338, .357, .38, .380, .40, .44, .45, .45-70, .50 BMG, 5.45 mm, 5.56 mm, 6.5 mm, 6.8 mm, 7 mm, 7.62 mm, 8 mm, 9 mm, 10 mm, 12.7 mm, 14.5 mm, 20 mm, 25 mm, 30 mm, 40 mm and others.

The present invention provides a method of determining the force necessary for the separation of a bullet from an ammunition cartridge comprising the steps of: providing a chamber housing comprising a central bore extending from a lower housing end to an upper housing end and terminating at a upper aperture through the upper housing end, wherein the central bore comprises a chamber diameter adapted to accept an ammunition cartridge and that the bullet partially extends from the upper aperture; a frustaconical shape shoulder in the central bore at the upper housing end to reduce the chamber diameter to mate to an ammunition cartridge shoulder; a neck that connects the upper aperture to the frustaconical shape shoulder adapted to accept an ammunition cartridge neck; a cartridge retention lip within the upper aperture adapted to contact an ammunition cartridge bullet aperture; inserting the ammunition cartridge into the central bore to extend the bullet through the upper aperture; securing the chamber housing to a platform; connecting a bullet securing device to the bullet such that the bull is connected to the bullet securing device; wherein the bullet securing device is in communication with a moving mechanism to move the bullet securing device away from the chamber housing; a sensor in communication with the bullet securing device to measure one or more properties of the movement of the bullet securing device relative to the chamber housing; moving the bullet securing device away from the chamber housing; separating the bullet from the ammunition cartridge; and recording the one or more properties that correlates to the separation of the bullet from the cartridge. The method further comprising the step of displaying the one or more properties to a display. The method further comprising the step of comparing the one or more properties to a standard or reference. The sensor measures a force, a distance or a combination thereof. The method further comprising a display in communication with the sensor to display the one or more properties. The chamber housing is inserted into a platform adaptor that connects the housing to the platform. The chamber housing and the platform adaptor comprise a groove and tab configuration, a slot or a combination thereof. The chamber housing is slidably connected to the platform adaptor. The chamber housing is connected to the platform adaptor by one or more fasteners. The central bore accepts a caliber selected from 17, 22, .22-250, .223, .243, .25-06, .270, .300, .30-30, .30-40, 30.06, .300, .303, .308, .338, .357, .38, .380, .40, .44, .45, .45-70, .50 BMG, 5.45 mm, 5.56 mm, 6.5 mm, 6.8 mm, 7 mm, 7.62 mm, 8 mm, 9 mm, 10 mm, 12.7 mm, 14.5 mm, 20 mm, 25 mm, 30 mm, 40 mm and others.

BRIEF DESCRIPTION OF THE SEVERAL VIEWS OF THE DRAWINGS

For a more complete understanding of the features and advantages of the present invention, reference is now made to the detailed description of the invention along with the accompanying figures and in which.

DETAILED DESCRIPTION OF THE INVENTION

Figure 1A:
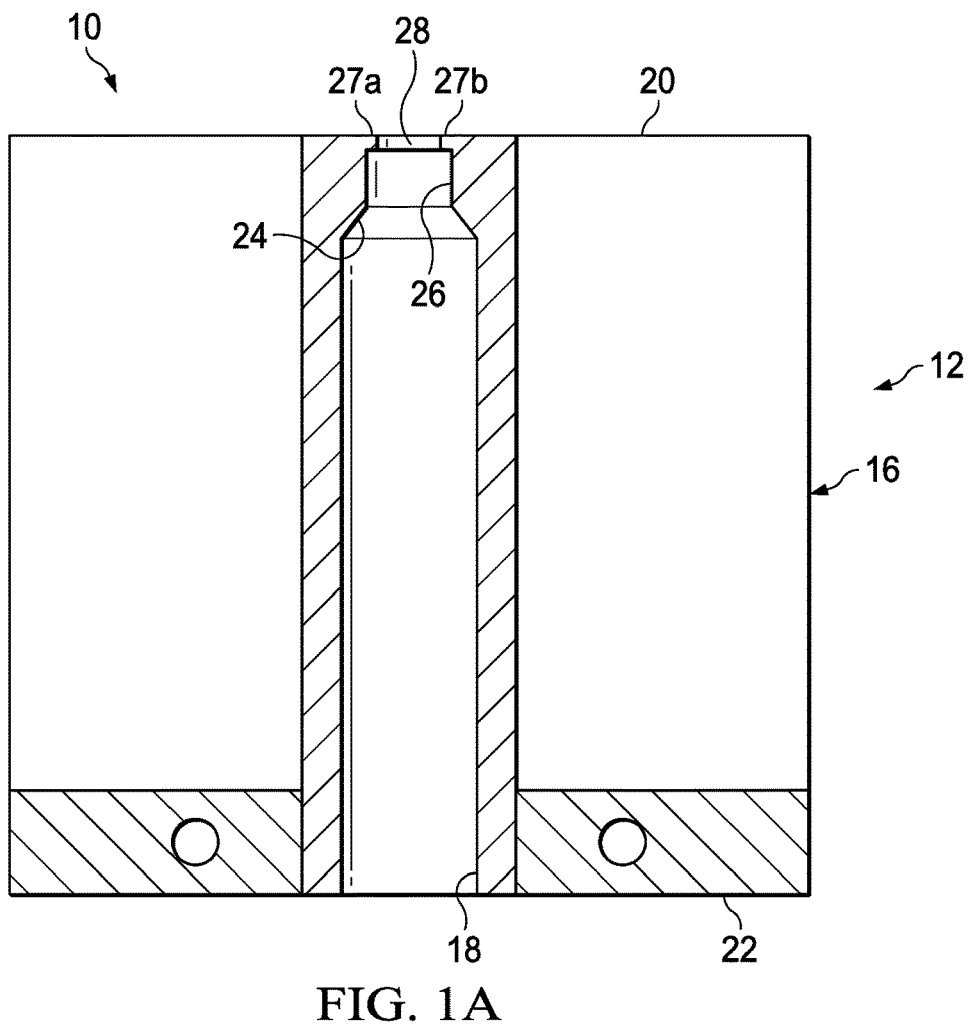
FIGS. 1A and 1B depict side, cross-sectional views of the testing device according to embodiments of the present invention.

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

As used herein, the term "ammunition", "ammunition article", "munition", and "munition article" as used herein may be used interchangeably to refer to a complete, assembled round or cartridge of that is ready to be loaded into a firearm and fired, including cap, casing, propellant, projectile, etc. Ammunition may be a live round fitted with a projectile, or a blank round with no projectile and may also be other types such as non-lethal rounds, rounds containing rubber bullets, rounds containing multiple projectiles (shot), tracer rounds, and rounds containing projectiles other than bullets such as fluid-filled canisters and capsules. Ammunition may be any caliber of pistol or rifle ammunition, e.g., non-limiting examples include .22, .22-250, .223, .243, .25-06, .270, .277, .300, .30-30, .30-40, 30.06, .300, .303, .308, .338, .357, .38, .380, .40, .44, .45, .45-70, .50 BMG, 5.45 mm, 5.56 mm, 6.5 mm, 6.8 mm, 7 mm, 7.62 mm, 8 mm, 9 mm, 10 mm, 12.7 mm, 14.5 mm, 20 mm, 25 mm, 30 mm, 40 mm and others.

As used herein, the term "casing" and "case" and "body" are used interchangeably (e.g., "cartridge casing", "cartridge case" and "casing body") to refer to the portion of the ammunition that remains intact after firing and includes the propellant chamber and may include the primer insert. A cartridge casing may be one-piece, two-piece, three piece or multi-piece design that includes a mouth at one end and a primer insert at the other separated by a propellant chamber.

As used herein the term "projectile" is used interchangeably with bullet and denotes any type of bullet.

The amount of force necessary to remove a bullet or projectile from an ammunition cartridge can be referred to as the "bullet pull," "pull strength," "bullet pull strength" etc. As bullet pull strength increases, so does the pressure inside the ammunition casing prior to the bullet firing. This may be a positive or a negative for ballistics engineers, depending on the goal or desired results.

A traditional cartridge casing generally has a deep-drawn elongated body with a primer end and a projectile end. During use, a weapon's cartridge chamber supports the majority of the cartridge casing wall in the radial direction, however, in many weapons, a portion of the cartridge base end is unsupported. During firing, the greatest stresses are concentrated at the base end of the cartridge, which must have great mechanical strength. This is true for both subsonic and supersonic ammunition cartridges.

During the process of manufacturing brass ammunition, a bullet is secured into a brass ammunition cartridge and the brass cartridge neck is crimped to secure the shank of the bullet to the neck. However, this process is not possible in manufacturing polymer ammunition using a polymer cartridge given the nature of the polymer neck. Therefore, the bullet is secured in the projectile aperture by other means. The bullet must be held securely so that it is not dislodged, loosened or repositioned in the projectile aperture. Given these differences it is necessary to quantify the amount of force required to remove the bullet from the cartridge to reproducibility, maintain quality control, meet safety standards and meet or exceed the standards set by the industry.

Typically, brass ammunition must meet a specific "bullet pull" requirement, i.e., the amount of force necessary to remove a bullet from a cartridge. Currently for brass ammunition cartridges, the brass cartridge is secured at the cartridge head by connecting the rim or extractor groove of the brass cartridge to the testing device. The testing device then forcefully seizes the bullet using a collet type clamp. With the brass ammunition held at both ends the testing device can move the collet type clamp away from the cartridge and using the connected sensors determine the amount of force necessary to separate the bullet from the cartridge. The force to remove the bullet can then be compared to other samples or standards to maintain quality control.

However, the current methods do not provide an accurate determination of the force required to remove a bullet from the projectile aperture when using a polymer ammunition cartridge. Even though polymer ammunition cartridges and brass ammunition cartridges of the case caliber have generally the same profile, they do not have the same properties. This is due to the unique properties of the polymer material when compared to a unitary brass cartridge. When a polymer cartridge is tested using the current standard testing device and method the amount of force necessary to remove the bullet is inaccurate. The polymer ammunition cartridge is secured at the cartridge head by connecting the rim or extractor groove of the polymer cartridge to the testing device. The testing device then forcefully seizes the bullet using a collet type clamp. With the polymer ammunition held at both ends the testing device can move the collet type clamp away from the cartridge and using the connected sensors determine the amount of force necessary to separate the bullet from the cartridge. However, the polymer cartridge is subjected to the pulling force and may begin to elongate as a result of the separation force. Therefore, the testing device and method do not provide an accurate value for comparison. As a result of these short comings, the present invention provides a method of testing the force necessary to remove a bullet from an ammunition cartridge taking into account the unique properties of the polymer cartridge and bullet retention means.

To develop a more accurate testing device, the present inventors developed a testing chamber that more accurately approximates the chamber and conditions that the ammunition is exposed to when fired. The testing device includes at least 2 separate portions, a chamber housing and a bullet clamp. The testing device includes in its simplest form a chamber housing secured to a first surface and a bullet clamping device attached to movable member. The movable member can be used to separate the chamber housing from the bullet clamping device, (i.e., remove the bullet from the cartridge) and measure and/or record the force required to remove the bullet from the cartridge. In the alternative, the bullet clamping device may be secured to a first surface and the chamber housing attached to the movable member. In another embodiment, both the chamber housing and the bullet clamping device may be attached to a movable member that moves the chamber housing and the bullet clamping device in opposite directions.

The bullet clamping device may be any device capable of holding the bullet securely in position. The bullet clamping device may be a collet, a clamp, a vice, chuck, or any other mechanism that can be used to secure the bullet to the device for testing.

In operation, the ammunition is placed into the housing such that the projectile extends from the housing. The housing includes an interior chamber adapted to mate to the ammunition cartridge and includes a shoulder and a neck, e.g., similar to an ammunition chamber and a rifle or gun. The housing includes an aperture that allows passage from the interior chamber through the top of the housing. This aperture allows a project to protrude from the housing while the ammunition cartridge is secured inside the chamber. The shoulder and the neck of the ammunition cartridge are fitted against the mating surfaces inside the housing, securing the ammunition cartridge within the housing. The housing is then connected to the platform in a fixed relationship so that the housing is immovable. In some embodiments, the housing is directly connected to the platform and secured with one or more fasteners. In other embodiments, a platform adapter is connected to the platform and the housing connected to the platform adapter. The platform adapter includes a junction that is adapted to fit or mate to the housing to secure the adapter and the ammunition to the platform so that it cannot move. With the bullet extending from the top of the housing, a bullet clamping device can be used to secure the bullet to the bullet clamping device such that the force required to separate the bullet from the cartridge can be measured. The bullet clamping device may be connected to a sensor to measure, record and/or compare the force required to separate the moving mechanism to the bullet clamping device away from the platform and separate the bullet from the cartridge. The sensor may be any sensor capable of measuring a force, distance, energy or any other physical characteristic. The force can then be recorded, displayed, reported, saved, and/or compared to a standard, internal control, a quality control standard, various lots, other ammunitions or any other value. The moving mechanism may be any mechanism that facilitates the movement of the bullet clamping device away from the housing or maybe any mechanism that facilitates the movement of the housing away from the bullet clamping device. The moving mechanism maybe any mechanism that facilitates movement, e. g., mechanical mechanism, hydraulic mechanism, electrical mechanism, electromagnetic mechanism, gear driven mechanism or any other mechanism capable of movement.

Figure 1B:
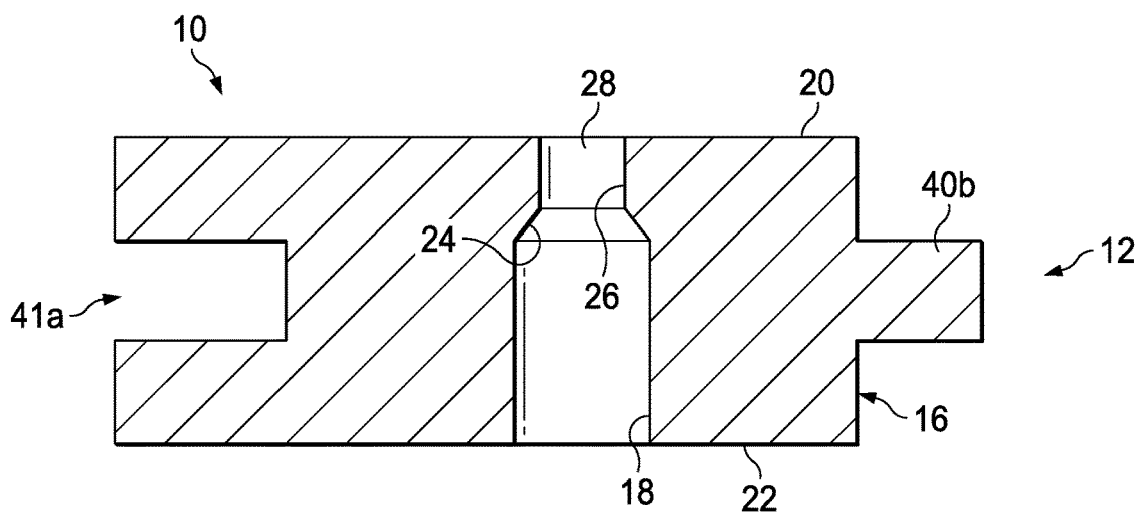
Figure 2A:
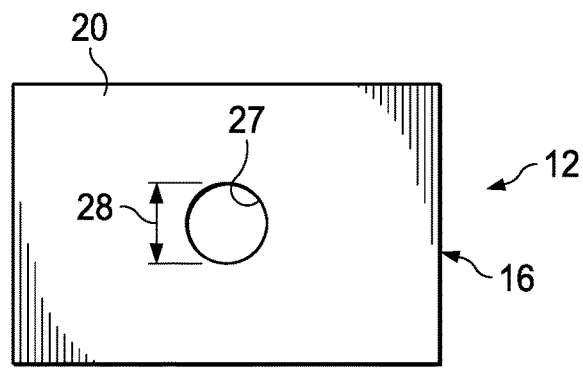
FIGS. 2A-2B depict side, cross-sectional views of the testing device housing an ammunition cartridge according to embodiments of the present invention.
Figure 2B:
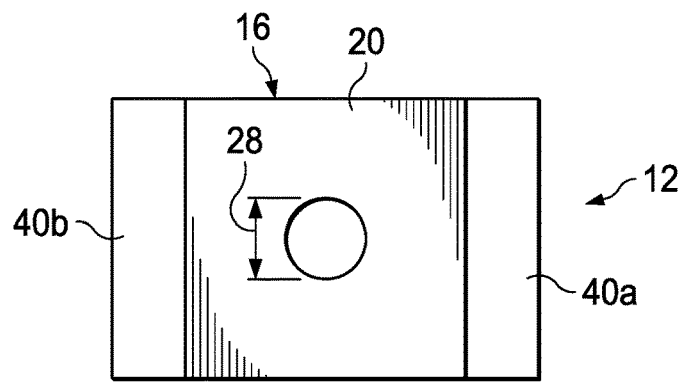
Figure 3A:
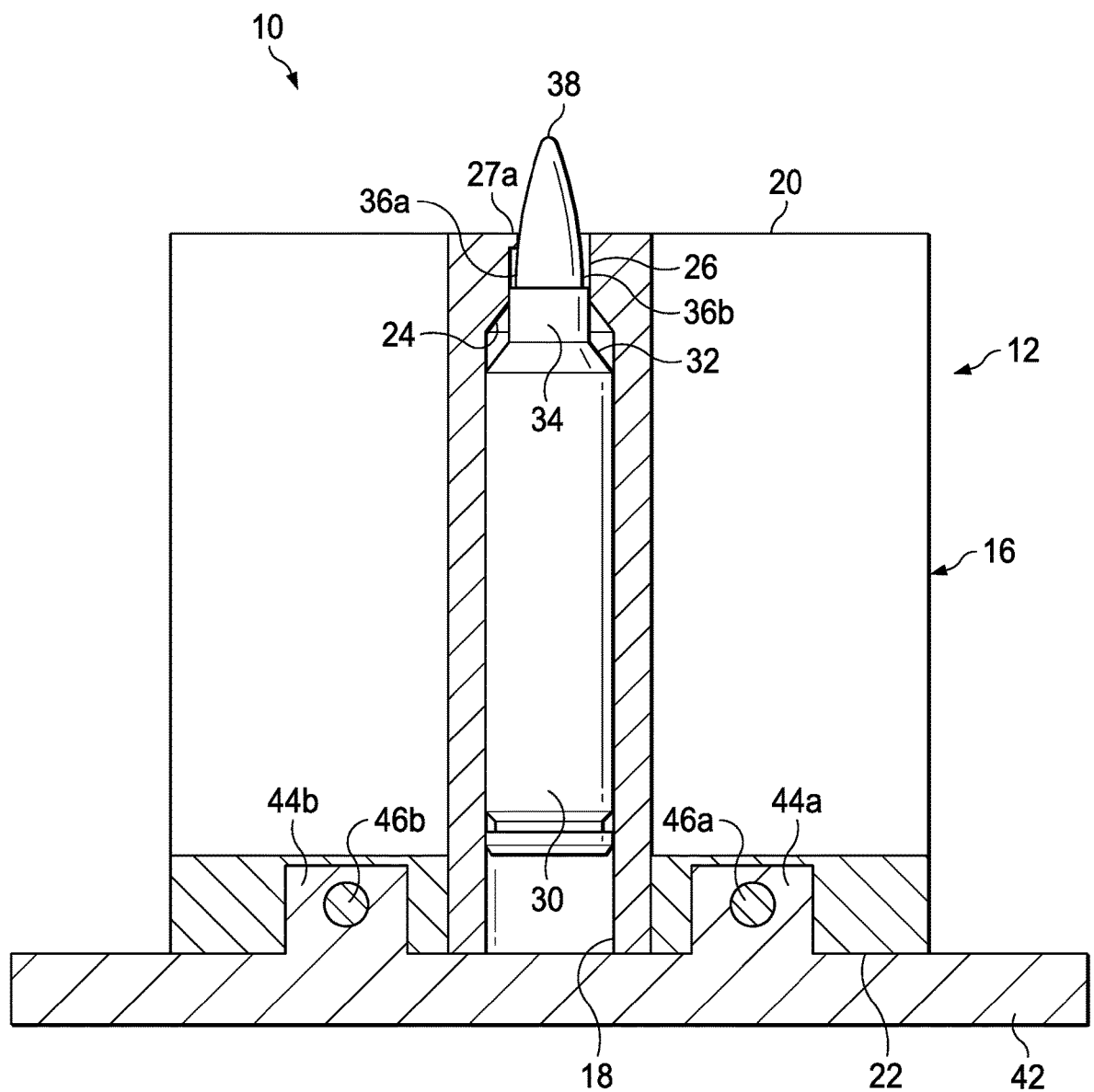
FIGS. 3A, 3B and 3C depict side views of the testing device according to embodiments of the present invention.
Figure 3B:
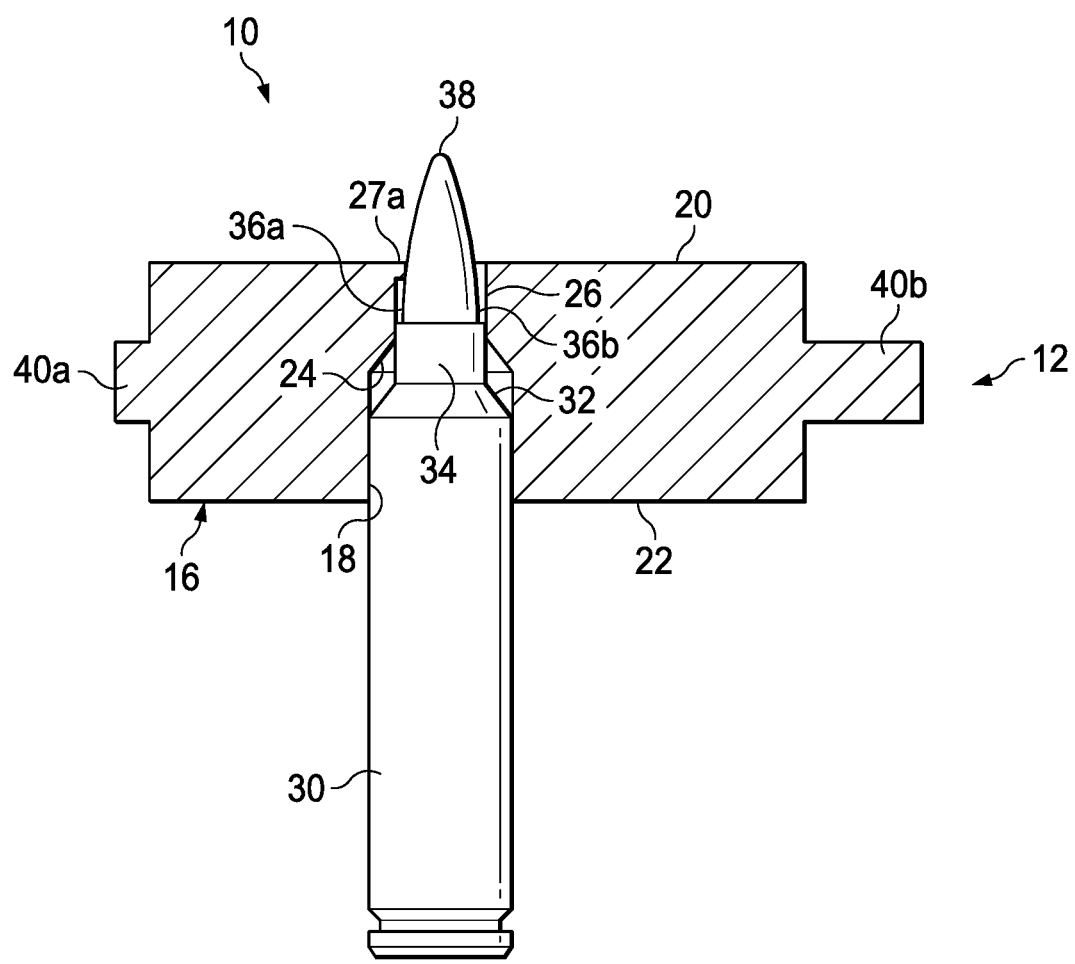

FIGS. 1A, 2A, and 3A show a housing used to secures the projectile and is mounted and secured onto or into a bottom platform. FIGS. 1B, 2B, and 3B show a housing that secures the ammunition by connecting the housing to a platform adapter that is in turn connected to the platform for testing. The holder and the housing may have a mating tab and groove configuration that allows quick and easy swapping of the housing to accommodate different size and caliber, in both polymer ammunition, brass ammunition, composite ammunition, or a combination thereof. Although the holder and the housing may be frictionally fitted, slip fitted, clipped, bolted or fastened to connect the devices. Although the images depict a square or rectangular, oval, round, triangular or combinations thereof that are configured and may be any configuration, size, dimensions and so forth. In some embodiments, the mating configuration may be the same on both sides. However, in other embodiments, the side may be different. The mating configuration may be any means known to the skilled artisan and may be the same on each side of the housing or different on each side.

FIGS. 1A and 1B show a cut away view of the chamber housing. The ammunition securing device 10 includes the chamber housing 12 having a body member 16 with a central bore 18 extending vertically through the body member 16 between the upper housing end 20 and the lower housing end 22. The central bore 18 generally has the profile of an ammunition cartridge (not shown) to accommodate the ammunition. The central bore 18 has a shoulder region 24 with a frustaconical shape near the upper housing end 20 that reduces the inner diameter. The shoulder region 24 is connected to a neck region 26 that further reduces the inner diameter and terminates at a cartridge retention lip 27a and 27b that extends around the upper aperture 28. In some embodiments, the projectile aperture (not shown) protrudes from the aperture. In other embodiments, a cartridge retention lip 27a and 27b is positioned in the device aperture to contact the projectile aperture (not shown) of the cartridge to further resist the force being applied to the projectile. The chamber housing 12 is attached to the testing device (not shown) by a mounting means. The mounting means can be any means necessary to connect the chamber housing 12 to the testing equipment. For example, the lower ends 22 may include a threaded adaptor that threads to the testing equipment, the chamber housing 12 may thread directly to the testing equipment, locking pins may be used to secure the chamber housing 12 to the testing equipment, tong and groove configurations may be used to secure the chamber housing 12 to the testing equipment and other means known to the skilled artisan may be used as necessary. Generally, the ammunition caliber being tested will use the corresponding ammunition caliber chamber housing 12. For example, a round chambered in .308 will use a housing that has a central bore with a .308 ammunition cartridge profile. The projectile will protrude from the upper aperture 28 of the housing 12 with the ammunition shoulder contacting the shoulder region 24 of the central bore 18. The cartridge retention lip 27 can be seen around the inner diameter of the upper aperture 28. FIG. 1B shows a tab 40b and slot 41a on the chamber housing 12 that mates to the corresponding fitting on the device (not shown) to secure the chamber housing 12. In some embodiments, the sides of the chamber housing 12 are symmetrical while in other embodiments, the sides are asymmetrical.

Figure 2C:
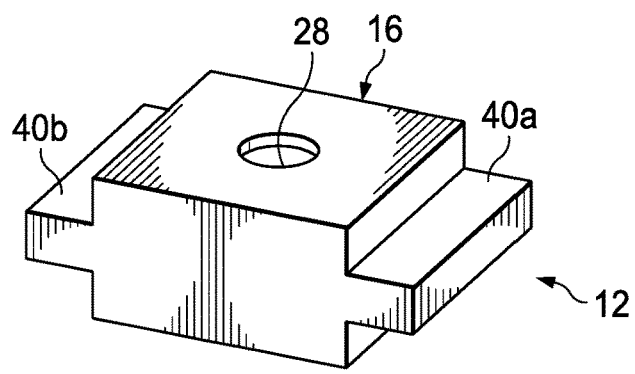
FIG. 2C depicts an elevation view of the testing device housing an ammunition cartridge according to embodiments of the present invention.

FIGS. 2A and 2B are a top view of the chamber housing. FIG. 2C is a perspective view of the chamber housing. The chamber housing 12 includes a body member 16 having a central bore (not shown) extending vertically through the body member 16 between the upper end 20 and lower end (not shown) showing the upper aperture 28. Tab 40a and tab 40b are shown on the sides of the body member 16.

FIGS. 3A and 3B both show different embodiments as a cut away view of the chamber housing. The ammunition securing device 10 includes the chamber housing 12 having a body member 16 with a central bore 18 extending vertically through the body member 16 between the upper housing end 20 and the lower housing end 22. The central bore 18 generally has the profile of an ammunition cartridge to accommodate the ammunition cartridge 30. The central bore 18 has a shoulder region 24 with a frustaconical shape near the upper housing end 20 that reduces the inner diameter. The shoulder region 24 has a shape that approximates the shape of the ammunition shoulder 32. The shoulder region 24 is connected to a neck region 26 that further reduces the inner diameter. The neck region 26 is adapted to accommodate the ammunition neck 34 such that the bullet 38 is accessible from the upper housing end 20. The central bore 18, alternatively includes a cartridge retention lip 27 (not shown) that contacts the bullet aperture 36 (36a left side and 36b right side). The chamber housing 12 is secured to the platform 42 by aligning the platform tabs 44A and 44b with the retaining mechanisms 46A and 46B. A bullet securing device (not shown) is attached to the bullet. With the cartridge secured in the chamber housing 12 which is secured to the platform and the bullet connected to the bullet securing device (not shown) the force to remove the bullet from the cartridge can be measured when the force measuring device is in communication with bullet securing device (not shown). Tab 40b and slot 41a on the chamber housing 12 mates to the corresponding fitting on the device (not shown) to secure the chamber housing 12. In some embodiments, the sides of the chamber housing 12 are symmetrical while in other embodiments, the sides are asymmetrical.

Figure 3C:
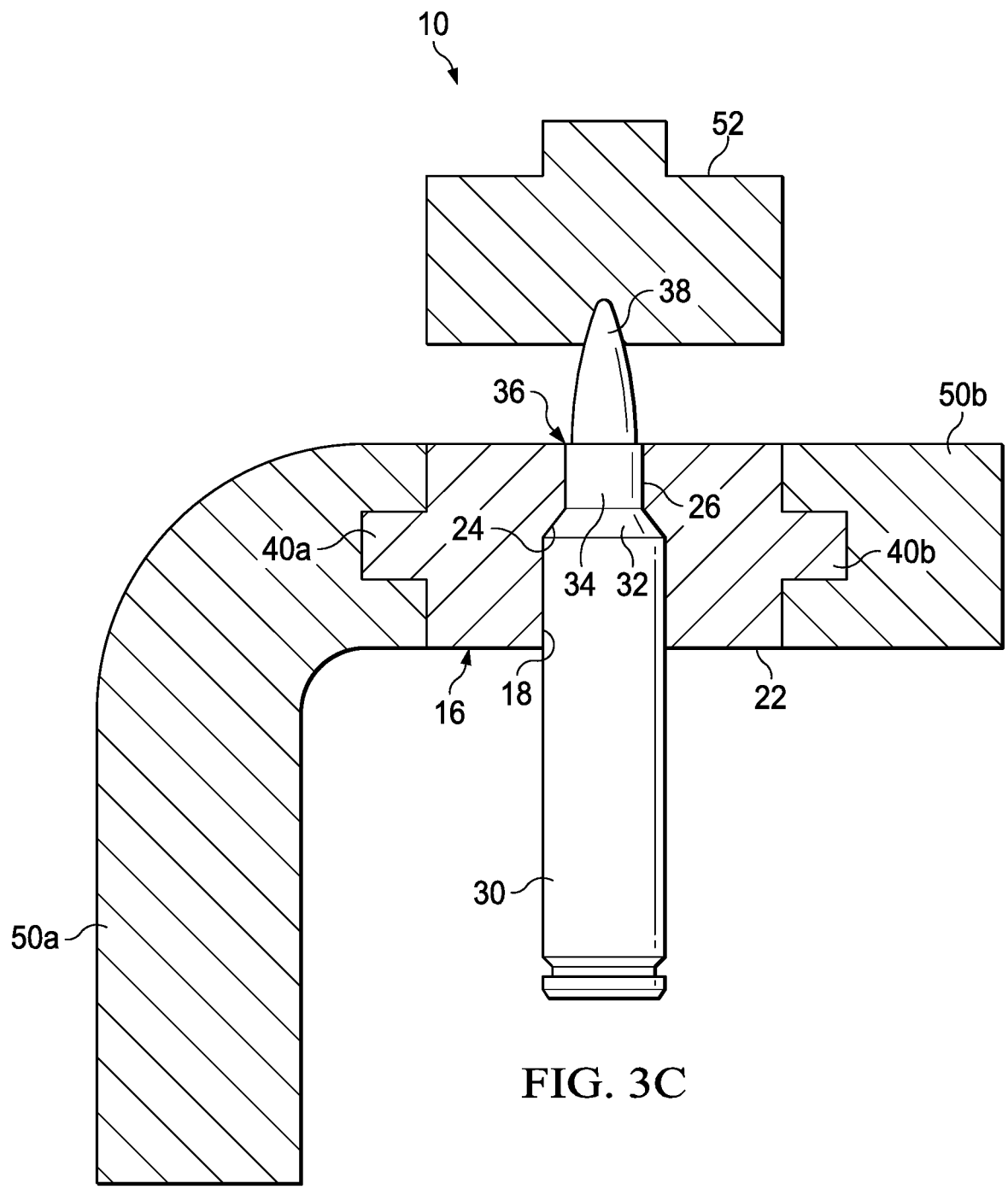

FIG. 3C is a cut away view of the chamber housing. The ammunition securing device 10 includes the chamber housing 12 having a body member 16 with a central bore 18 extending vertically through the body member 16 between the upper housing end 20 and the lower housing end 22. The central bore 18 generally has the profile of an ammunition cartridge to accommodate the ammunition cartridge 30. The central bore 18 has a shoulder region 24 with a frustaconical shape near the upper housing end 20 that reduces the inner diameter. The shoulder region 24 has a shape that approximates the shape of the ammunition cartridge shoulder 32. The shoulder region 24 is connected to a neck region 26 that further reduces the inner diameter. The neck region 26 is adapted to accommodate the ammunition cartridge neck 34 such that the bullet 38 protrudes from and is accessible from the bullet aperture 36 of the upper housing end 20. The central bore 18 may alternatively include a cartridge retention lip 27a that contacts the bullet aperture 36. Tab 40a and tab 40b are shown on the sides of the body member 16 to secure it to the platform adapter 50a and 50b that secures the device to the platform. A bullet securing device 52 is attached to the bullet to secure the bullet securing device 52 to the bullet 38. With the cartridge secured in the chamber housing 12 which is secured to the platform and the bullet connected to the bullet securing device 52 the force to remove the bullet from the cartridge can be measured when a sensor (not shown) that is communication with the force measuring device which is in turn in communication with bullet securing device 52.

Each ammunition caliber being tested will use the corresponding ammunition chamber housing, where the central bore diameter, the frustaconical shape of the shoulder region, the neck length and diameter, upper aperture diameter, and cartridge retention lip size are specific for the ammunition caliber being tested. For example, an ammunition round chambered in .50 caliber will use a .50 caliber ammunition profile housing having all of the dimensions (central bore diameter, the frustaconical shape of the shoulder region, the neck length and diameter, and upper aperture diameter) specifically for the 50 caliber ammunition.

In another embodiment the ammunition to be tested may not have a shoulder and/or neck depending on the specific caliber or round. In some instances, the device can be used by utilizing an ammunition cartridge retention lip that is in contact with the bullet aperture to secure the ammunition cartridge in the device. The ammunition securing device includes the chamber housing having a body member with a central bore extending vertically through the body member between the upper housing end and the lower housing end. The central bore generally has the profile of an ammunition cartridge (not shown) to accommodate the ammunition. The central bore terminates at a cartridge retention lip that extends around the upper aperture. The shoulder of the housing contacts the shoulder of the ammunition cartridge to resist the force being applied to the projectile. The cartridge retention lip contacts the projectile aperture of the cartridge to resist the force being applied to the projectile. The chamber housing is attached to the testing device by a mounting means. The mounting means can be any means necessary to connect the chamber housing to the testing equipment. For example, the lower ends may include a threaded adaptor that threads to the testing equipment, the chamber housing may thread directly to the testing equipment, locking pins may be used to secure the chamber housing to the testing equipment, tong and groove configurations may be used to secure the chamber housing to the testing equipment and other means known to the skilled artisan may be used as necessary.

The ammunition, cartridge, projectile, and/or bullet and in turn the central bore profile may be of any standard or modified caliber and included but not limited to 17, 22, .22-250, .223, .243, .25-06, .270, .300, .30-30, .30-40, 30.06, .300, .303, .308, .338, .357, .38, .380, .40, .44, .45, .45-70, .50 BMG, 5.45 mm, 5.56 mm, 6.5 mm, 6.8 mm, 7 mm, 7.62 mm, 8 mm, 9 mm, 10 mm, 12.7 mm, 14.5 mm, 20 mm, 25 mm, 30 mm, 40 mm and others. The amount of force necessary to remove a bullet from an ammunition cartridge depends on select variables (including caliber, sealant, etc.) but generally range from around 80 to around 400 lbfs, around 100 to 350 lbfs, or around 120 to around 300 lbf. Or more specifically, 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, 110, 111, 112, 113, 114, 115, 116, 117, 118, 119, 120, 121, 122, 123, 124, 125, 126, 127, 128, 129, 130, 131, 132, 133, 134, 135, 136, 137, 138, 139, 140, 141, 142, 143, 144, 145, 146, 147, 148, 149, 150, 151, 152, 153, 154, 155, 156, 157, 158, 159, 160, 171, 172, 173, 174, 175, 176, 177, 178, 179, 180, 181, 182, 183, 184, 185, 186, 187, 188, 189, 190, 191, 192, 193, 194, 195, 196, 197, 198, 199, 200, 201, 202, 203, 204, 205, 206, 207, 208, 209, 210, 211, 212, 213, 214, 215, 216, 217, 218, 219, 220, 221, 222, 223, 224, 225, 226, 227, 228, 229, 230, 231, 232, 233, 234, 235, 236, 237, 238, 239 240, 241, 242, 243, 244, 245, 246, 247, 248, 249, 250, 251, 252, 253, 254, 255, 256, 257, 258, 259, 260, 261, 262, 263, 264, 265, 266, 267, 268, 269, 270, 271, 272, 273, 274, 275, 276, 277, 278, 279, 280, 281, 282, 283, 284, 285, 286, 287, 288, 289, 290, 291, 292, 293, 294, 295, 296, 297, 298, 299, 300, 301, 302, 303, 304, 305, 306, 307, 308, 309, 310, 311, 312, 313, 314, 315, 316, 317, 318, 319, 320, 321, 322, 323, 324, 325, 326, 327, 328, 329, 330, 331, 332, 333, 334, 335, 336, 337, 338, 339, 340, 341, 342, 343, 344, 345, 346, 347, 348, 349, or 350 foot pounds.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

All publications and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, MB, BBC, AAABCCCC, CBBAAA, CABABB, and so forth. The skilled artisan will understand that typically there is no limit on the number of items or terms in any combination, unless otherwise apparent from the context.

All of the compositions and/or methods disclosed and claimed herein can be made and executed without undue experimentation in light of the present disclosure. While the compositions and methods of this invention have been described in terms of preferred embodiments, it will be apparent to those of skill in the art that variations may be applied to the compositions and/or methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

What is claimed is:

1. A device for determining the force necessary for the separation of a bullet from an ammunition cartridge comprising:
    a chamber housing having a central bore extending from a lower housing end to an upper housing end and terminating at a upper aperture through the upper housing end, wherein the central bore comprises a chamber diameter adapted to accept an ammunition cartridge and that the bullet partially extends from the upper aperture; a frustaconical shape shoulder in the central bore at the upper housing end to reduce the chamber diameter to mate to an ammunition cartridge shoulder; a neck that connects the upper aperture to the frustaconical shape shoulder adapted to accept an ammunition cartridge neck; a cartridge retention lip within the upper aperture adapted to contact an ammunition cartridge bullet aperture;
    a chamber mount adapted to connect the chamber housing to a testing device surface;
    a bullet securing device comprising a bullet securing end to secure the bullet and a bullet securing device mount adapted to connect to the testing device;
    a moving mechanism to move the bullet securing device away from the chamber housing;
    a sensor in communication with the moving mechanism to measure a force exerted by the moving mechanism; and
    a display in communication with the sensor to display and or record the force.

2. The device of claim 1, wherein the chamber mount attaches to a platform.

3. The device of claim 1, wherein the chamber mount comprises a housing adaptor that connects the chamber mount to a platform.

4. The device of claim 1, wherein the bullet securing device comprises a collet, a clamp, a vice, chuck, or any other mechanism.

5. The device of claim 1, wherein the central bore accepts a caliber selected from 17, 22, .22-250, .223, .243, .25-06, .270, .300, .30-30, .30-40, 30.06, .300, .303, .308, .338, .357, .38, .380, .40, .44, .45, .45-70, .50 BMG, 5.45 mm, 5.56 mm, 6.5 mm, 6.8 mm, 7 mm, 7.62 mm, 8 mm, 9 mm, 10 mm, 12.7 mm, 14.5 mm, 20 mm, 25 mm, 30 mm, 40 mm and others.

6. A method of determining the force necessary for the separation of a bullet from an ammunition cartridge comprising the steps of:
    providing a chamber housing comprising a central bore extending from a lower housing end to an upper housing end and terminating at a upper aperture through the upper housing end, wherein the central bore comprises a chamber diameter adapted to accept an ammunition cartridge and that the bullet partially extends from the upper aperture; a frustaconical shape shoulder in the central bore at the upper housing end to reduce the chamber diameter to mate to an ammunition cartridge shoulder; a neck that connects the upper aperture to the frustaconical shape shoulder adapted to accept an ammunition cartridge neck; a cartridge retention lip within the upper aperture adapted to contact an ammunition cartridge bullet aperture;

inserting the ammunition cartridge into the central bore to extend the bullet through the upper aperture;

securing the chamber housing to a platform;

connecting a bullet securing device to the bullet such that the bull is connected to the bullet securing device;

wherein the bullet securing device is in communication with a moving mechanism to move the bullet securing device away from the chamber housing;

a sensor in communication with the bullet securing device to measure one or more properties of the movement of the bullet securing device relative to the chamber housing;

moving the bullet securing device away from the chamber housing;

separating the bullet from the ammunition cartridge; and recording the one or more properties that correlates to the separation of the bullet from the cartridge.

7. The method of claim 3, further comprising the step of displaying the one or more properties to a display.

8. The method of claim 3, further comprising the step of comparing the one or more properties to a standard or reference.

9. The method of claim 3, wherein the sensor measures a force, a distance or a combination thereof.

10. The method of claim 3, further comprising a display in communication with the sensor to display the one or more properties.

11. The method of claim 3, wherein the chamber housing is inserted into a platform adaptor that connects the housing to the platform.

12. The method of claim 1, wherein the chamber housing and the platform adaptor comprise a groove and tab configuration, a slot or a combination thereof.

13. The method of claim 1, wherein the chamber housing is slidably connected to the platform adaptor.

14. The method of claim 1, wherein the chamber housing is connected to the platform adaptor by one or more fasteners.

15. The method of claim 1, wherein the central bore accepts a caliber selected from 17, 22, .22-250, .223, .243, .25-06, .270, .300, .30-30, .30-40, 30.06, .300, .303, .308, .338, .357, .38, .380, .40, .44, .45, .45-70, .50 BMG, 5.45 mm, 5.56 mm, 6.5 mm, 6.8 mm, 7 mm, 7.62 mm, 8 mm, 9 mm, 10 mm, 12.7 mm, 14.5 mm, 20 mm, 25 mm, 30 mm, 40 mm and others.

* * * * *